United States Patent
Narahara (10) Patent No.: US 7,127,476 B2
(45) Date of Patent: Oct. 24, 2006

(54) APPARATUS AND METHOD FOR DOCUMENT PROCESSING AND MANAGEMENT

(75) Inventor: Kouichi Narahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 576 days.

(21) Appl. No.: 10/230,192

(22) Filed: Aug. 29, 2002

(65) Prior Publication Data

US 2003/0051212 A1   Mar. 13, 2003

(30) Foreign Application Priority Data

Sep. 11, 2001   (JP) ..................... 2001-274960

(51) Int. Cl.
*G06F 17/30* (2006.01)

(52) U.S. Cl. .............. 707/203; 707/104.1; 715/511
(58) Field of Classification Search ............. 707/104.1, 707/203; 715/511
See application file for complete search history.

(56) References Cited

U.S. PATENT DOCUMENTS

| | | | |
|---|---|---|---|
| 5,850,298 A | 12/1998 | Narahara | |
| 6,023,527 A | 2/2000 | Narahara | |
| 6,757,676 B1 * | 6/2004 | Sugaya et al. | 707/5 |
| 2002/0007367 A1 | 1/2002 | Narahara | |
| 2002/0059227 A1 | 5/2002 | Narahara | |
| 2002/0186241 A1 * | 12/2002 | Kohda et al. | 345/744 |
| 2003/0041112 A1 * | 2/2003 | Tada et al. | 709/206 |
| 2004/0088313 A1 * | 5/2004 | Torres | 707/101 |

FOREIGN PATENT DOCUMENTS

JP    2000-20202    1/2000

* cited by examiner

*Primary Examiner*—Frantz Coby
*Assistant Examiner*—Neveen Abel-Jalil
(74) *Attorney, Agent, or Firm*—Dickstein Shapiro LLP

(57) ABSTRACT

A storage location and a name of a document designated by a user are displayed on a main window screen. A viewing history management section determines if the information in display has been viewed before by referring to a content of a document management information storage section, acquires an ID number corresponding to the information if viewed before, and, if not, issues a new ID and registers it in the storage section. A list of a related document group is created by analyzing viewing history information accumulated daily, determining a document group related to a document in view, and creating the group as a list.

18 Claims, 7 Drawing Sheets

| ID | DOCUMENT NAME | STORAGE LOCATION |
|---|---|---|
| 1 | ×××× FINANCE | http://www.quote.XXXX.co.jp |
| 2 | MONEY & MARKET | http://markets.OOOO.co.jp |
| 3 | ABC Mail Media | http://jmm.ABC.co.jp |
| 4 | DEF MARINERS | http://DEF.mlb.com |
| 5 | GHI METS | http://GHI.mlb.com |
| 6 | Analyst YAMADA TARO | http://www.O×O×.co.jp |
| 7 | OOINTELLIGENCE SOCIETY | http://csl.OO.co.jp |
| 8 | ◁◁◁LINK | http://◁◁◁.com |
| 9 | SECURITIES PUBLIC RELATIONS | http://□□□.or.jp |
| 10 | O◁□Inc. | http://O◁□.com/markets |

APPARATUS AND METHOD FOR DOCUMENT PROCESSING AND MANAGEMENT

BACKGROUND OF THE INVENTION

1) Field of the Invention

The present invention relates to an apparatus or a system and method which deals with a large amount of document data and particularly relates to a document processing and management apparatus which manages stored document groups. More particularly, this invention relates to a document processing and management apparatus which extracts documents related to a document in view, from a large amount of stored document groups.

2) Description of the Related Art

As communications technology has been progressing in recent years, anyone can acquire various pieces of information. On the other hand, an amount of information to be dealt with has been greatly increasing. Therefore, it is essential to efficiently find out any desired information or document from a huge amount of information.

Generally, in a computer filing system, documents are managed using hierarchical directories, and the documents are thoroughly classified and ordered on the hierarchical directories and thereby facilitating searching a related document. In addition, there are known various search tools which are provided to search a document including a specific word or phrase by searching a keyword. This keyword search enables finding of a related document which includes a specific word or phrase.

In the World Wide Web (WWW) on the Internet, related documents can be connected to one another by link to facilitate reference to the related documents. Further, there is known a technique for WWW browsers or the like, for displaying a document viewing history in a certain period or by a certain number of documents and sequencing the documents according to viewing frequency.

In relation to such information and document search techniques, Japanese Patent Application Laid-Open No. 2000-20202 describes an information reference supporting device which analyzes a user viewing history of information based on criteria for judgment on the degree of importance that are designated by the user, and which displays information of the high degree of importance by symbols which are associated with the information by the user according to this analysis result.

However, if a document is to be viewed, a user often wants only to refer to documents related to the document. If documents are managed by hierarchical directories, it is easy to find out related documents. This, however, requires an operation for classifying the documents in advance when the documents are stored. Further, with an increase in the number of documents, it is often necessary to change a classification system, and it takes a lot of labor and time to make this change.

It is possible to find related documents each of which includes a specific word or phrase using the keyword search technique, but a keyword entry is essential. Further, it is not always easy to select an appropriate keyword to search the related documents.

If a WWW browser or the like is used, it is required to carry out operations for studying the relation of documents and establishing links among related documents in advance so as to facilitate reference to the related documents.

According to a method for displaying a document viewing history within a certain period or by a certain number of documents, a method of sequencing documents according to viewing frequency, or to the information reference supporting device described in Japanese Patent Application Laid-Open No. 2000-20202, it is not always possible to efficiently find out documents related to a certain document. It is therefore necessary to carry out an operation for defining the relationship between the symbols and the judgment criteria for the degree of importance in advance.

Figure 9:
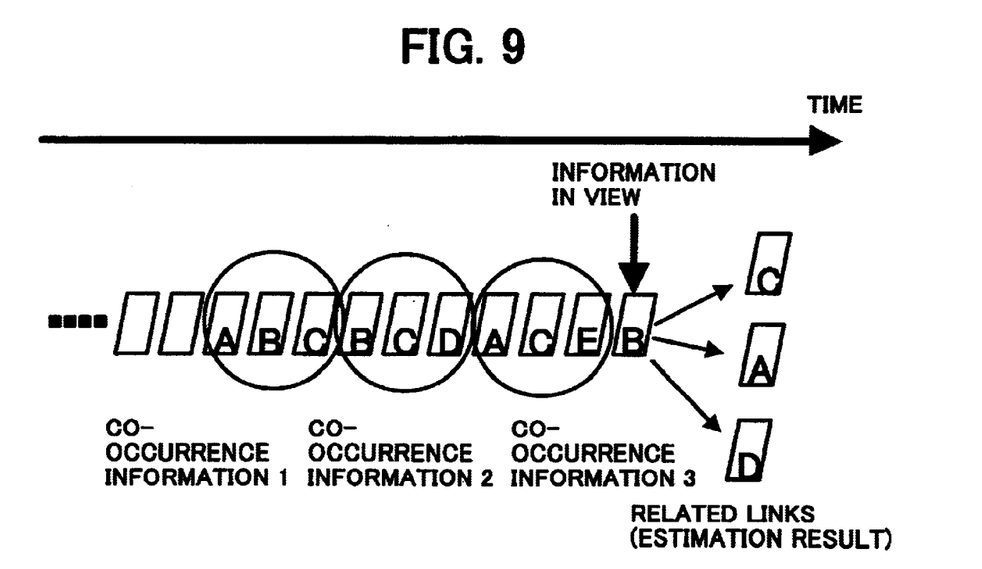
FIG. 9 is a schematic view which explains document viewing history information.

In general, it is found from observation of a document utilization status that every document is not always viewed uniformly and documents to be viewed vary depending on individual users. There is a statistical property that a document group which is much interested and viewed highly frequently is repeatedly referred to, that is, as co-occurrence information. The co-occurrence information mentioned here indicates a document which is referred to during a series of coherent operations. FIG. 9 is a schematic view which explains information for a document viewing history. In FIG. 9, viewed documents are arranged as "A", "B", "C", . . . in time series and encircled in units of a series of operations as co-occurrence information. If the time series is observed while taking FIG. 9 as an example, it is seen that there is a marked trend that if "B" is viewed, "C" is simultaneously viewed, followed by "A" and "D", but that "E" is not viewed simultaneously with "B".

SUMMARY OF THE INVENTION

It is one object of the present invention to provide a document processing and management apparatus capable of automatically extracting any document which is highly likely to be related to a document in view, from a stored document group without the need to carry out operations for classifying and ordering documents, establishing a link among the documents, and inputting a keyword or the like in advance by paying attention to a statistical property that documents to be viewed or referred to vary according to users.

It is another object of the present invention to provide a document processing and management apparatus capable of facilitating reference to documents related to a document in view without carrying out prior operations for classifying and ordering documents and establishing a link among the documents, which support the document reference operation, and for inputting a keyword or the like in advance.

The document processing and management apparatus according to this invention comprises a document data storage unit which stores received document data, an instruction input unit which urges input of a viewing instruction to view the document data which is stored in the document data storage unit or a change instruction to change to-be-viewed document data, and a viewing history storage unit which extracts the document data as a target to which the viewing instruction is issued, from the document data storage unit, and which stores the document data as viewed document history information associated with statistical numbers such as the number of times of viewing instructions and viewing time if the document data viewing instruction is input through the instruction input unit. The apparatus also comprises a document data extraction unit which analyzes the statistical numbers associated with the viewed document history information stored in the viewing history storage unit, and extracts document data for viewed document history information as related document data based on the analysis from the document data storage unit. The extracted document data has statistical numbers that are approximate to those of the document data as a target to which the viewing instruction is issued by the instruction input unit.

These and other objects, features and advantages of the present invention are specifically set forth in or will become apparent from the following detailed descriptions of the invention when read in conjunction with the accompanying drawings.

DETAILED DESCRIPTIONS

Embodiments of the present invention will be explained hereinafter in detail with reference to FIGS. 1 to 9.

Figure 1:
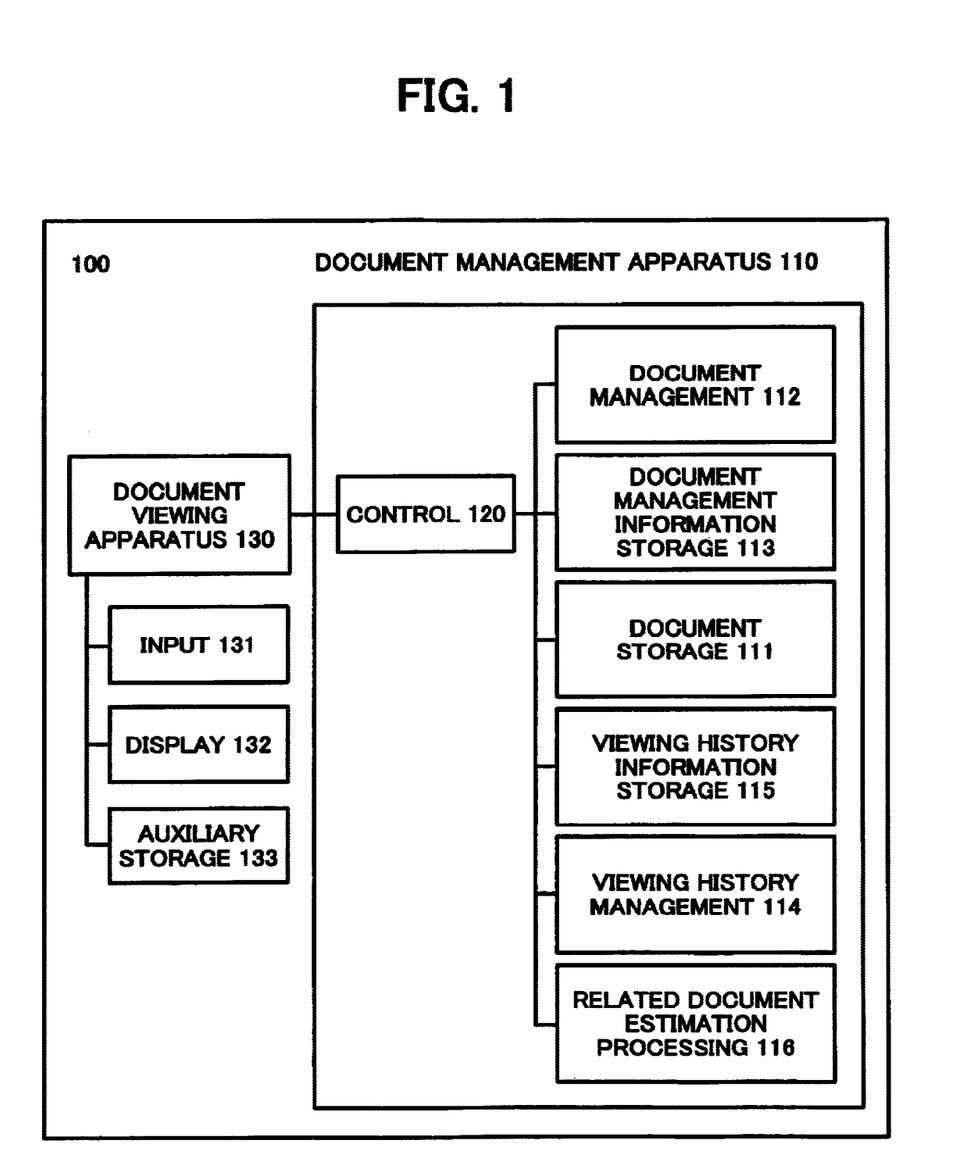
FIG. 1 is a block diagram which shows the schematic configuration of a document processing management system according to an embodiment of the present invention.

FIG. 1 is a block diagram which shows the schematic configuration of a document processing management system 100 according to one embodiment of the present invention.

The document processing management system 100 comprises a document management apparatus 110, and a document viewing apparatus 130 used to view documents which are managed by the document management apparatus 110.

The document viewing apparatus 130 includes an input apparatus 131 such as a keyboard and a mouse used by a user to input various instructions and data, a display device 132 which is used to display and operate documents, and an auxiliary storage 133 such as a hard disk drive. In this embodiment, a case where one unit of document viewing apparatus 130 is provided will be explained. Alternatively, a plurality of document viewing apparatuses 130 having the same configuration as explained above may be connected to the document management apparatus 110.

The document management apparatus 110 includes a document storage section 111 which stores substances of many documents, a document management section 112 which manages a group of documents which are stored in the document storage section 111, a document management information storage section 113 which stores document management information used to manage the documents by the document management section 112, a viewing history management section 114 which manages viewing histories related to the documents stored in the document storage section 111, and a viewing history information storage section 115 which stores the viewing history information generated by the viewing history management section 114. The document management apparatus 110 also includes a related document estimation processor 116 which extracts documents related to a target document to be viewed by the document viewing apparatus 130 from the documents stored in the document storage section 111 based on the viewing history information stored in the viewing history information storage section 115, and a controller 120 which provides controls over the operations of the respective sections, the overall operation of the document management apparatus 110, and over information exchange between the document management apparatus 110 and the document viewing apparatus 130.

The document processing management system 100 is assumed applicable to any of an embodiment in which the overall document processing management system 100 is realized as one single apparatus (a document processing and management apparatus) and an embodiment in which the document processing management system 100 is realized as an assembly of a plurality of apparatuses which are connected to one another through a network.

Another embodiments will next be explained with reference to FIGS. 2 and 3.

One of the embodiments in which the overall document processing management system 100 is realized as a single apparatus (the document processing and management apparatus) and the other embodiment in which the document processing management system 100 is realized as an assembly of a plurality of apparatuses which are connected to one another through a network will be explained.

Figure 2:
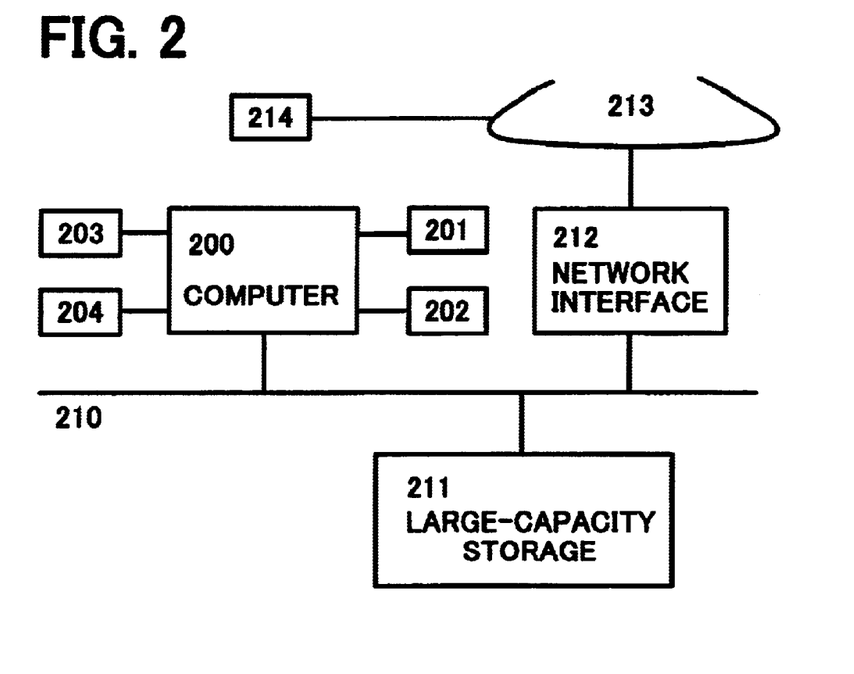
FIG. 2 is a view which shows another embodiment in which the document processing management system is realized as one document processing and management apparatus.

FIG. 2 shows the embodiment in which the document processing management system 100 is realized as one document processing and management apparatus. That is, in this embodiment, the document processing management system 100 is realized as a centralized system.

In FIG. 2, a general purpose computer 200 such as a workstation is provided with peripherals including a display device 201, an input device 202 such as a keyboard and a mouse, a hard disk drive 203, and a printer 204. Using the hardware resources of this computer 200, it is possible to realize the document management apparatus 110 and the document viewing apparatus 130 of the document processing management system 100 using software. In this case, several examples of hardware resources which are used as information storage sections (which correspond to the document storage section 111, the document management information storage section 113, and the viewing history information storage section 115 shown in FIG. 1) can be mentioned. For example, a common hard disk drive 203 can be used as the document storage section 111, the document management information storage section 113, and the viewing history information storage section 115.

A large-capacity storage 211 which is connected to the computer 200 through a LAN (local area network) 210 may be used as the document storage section 111, and the hard disk drive 203 may be used as the document management information storage section 113 and the viewing history information storage section 115.

A large-capacity storage which is owned by a computer 214 or the like on a network 213 such as the Internet or the other LAN connected to the computer 200 through a network interface 212 such as a router or a gateway can be used as the document storage section 111 or a part thereof.

Such an embodiment of the document processing management system may be used as a storage medium of various types such as a magnetic disk, an optical disk, a magneto-optical disk or a semiconductor storage element on which a program for realizing the document management apparatus 110 and the document viewing apparatus 130 is recorded.

Figure 3:
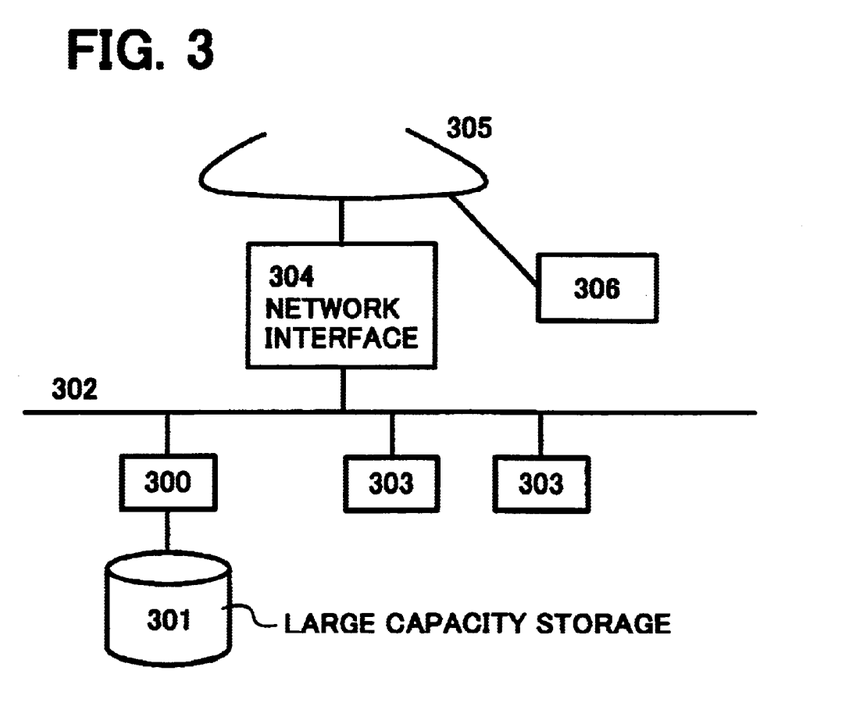
FIG. 3 is a view which shows still another embodiment in which the document processing management system is realized as an assembly of a plurality of apparatuses which are connected to one another through a network.

FIG. 3 is a view which shows the embodiment in which the document processing management system 100 is realized as an assembly of a plurality of apparatuses which are connected to one another through a network.

In FIG. 3, a computer 300, such as a workstation which functions as a server machine, includes a large-capacity storage 301. The document management apparatus 110 of the document processing management system 100 can be realized by software by using the hardware resource of this computer 300. The computer 300 is connected to computers 303, such as personal computers which function as client machines through a LAN 302 and are also connected to, for example, the other network 305 such as the Internet through a network interface 304. By using the hardware resources of at least one of the computers 303, the document viewing apparatus 130 of the document processing management system 100 can be realized by software.

By using a hardware resource such as a computer 306 which is connected to the network 305, at least one of the document viewing apparatuses 130 may be realized by software. The common large-capacity storage 301 can be used as the document storage section 111, the document management information storage section 113, and the viewing history information storage section 115. The other hard disk drive which is connected to the LAN 302 or a large-capacity storage such as the computer 306 connected to the network 305 may be used as the document storage section 111 or as a part thereof.

Such an embodiment of the document processing management system may be used as a recording medium of various types such as a magnetic disk, an optical disk, a magneto-optical disk or a semiconductor storage element on which a program for realizing the document management apparatus 110 is recorded.

The document processing management system 100 according to this embodiment can be thus applied as various embodiments.

The operation of the document processing management system 100 according to this embodiment will next be explained.

The document management section 112 of the document management apparatus 110 manages the document group in the document storage section 111 as a relational database. The document management section 112 of this type can be realized by, for example, ordinary software referred to as "a relational database management system (DBMS)". Document management information which is generated by the document management section 112 and stored in the document management information storage section 113 in order to manage documents can be structured as shown in, for example, FIG. 4. The respective records (respective rows in FIG. 4) of the document management information correspond to the stored documents one by one. Each record consists of three fields on which values of "ID (identification number)", "document name" and "storage location" which are document attributes are recorded, respectively.

Figure 4:
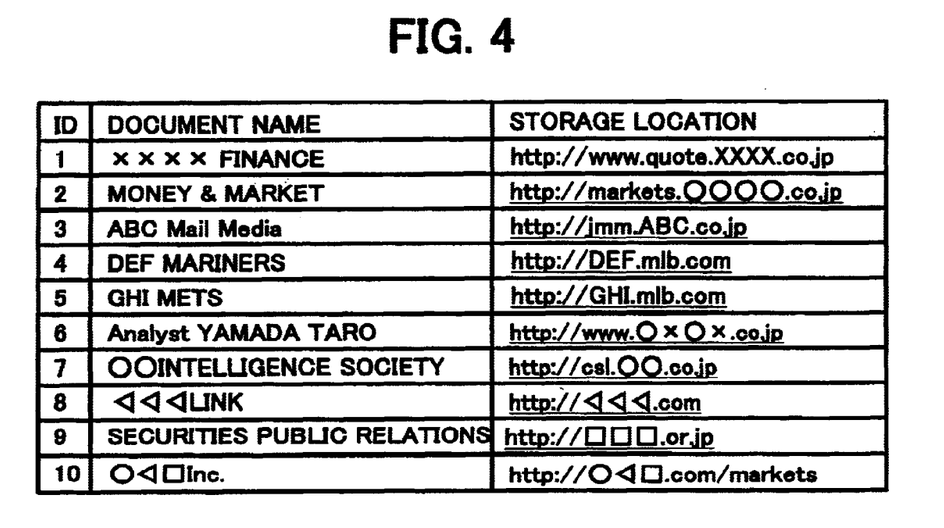
FIG. 4 is a view which shows one example of document management information.

In "ID" field, a value which represents ID for identifying each document is recorded. In "document name" field, a document name which a user allocates to each document is recorded. In "document storage location" field, information for specifying a location where the substance of each document is stored is recorded. For documents which are stored in a WWW server on the Internet, an URL (Uniform Resource Locator) is used as information to specify the storage location of each document.

The viewing history management section 114 manages viewing history information on the document group in the document storage section 111. The viewing history information stored in the viewing history information storage section 115 can be structured as shown in, for example, FIG. 5.

Figure 5:
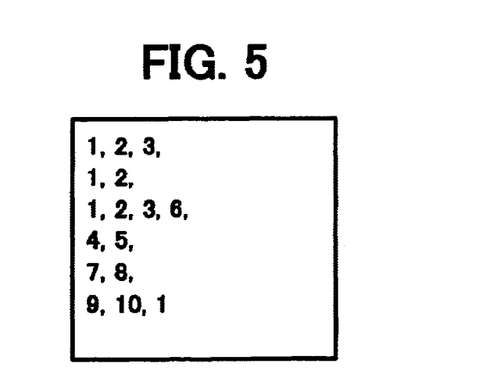
FIG. 5 is a view which shows one example of viewing history information.

In each row of the viewing history information, IDs of documents which are viewed in a series of operations are recorded. For example, in the first row, "1, 2, 3," which is a viewing history that documents with IDs "1", "2" and "3", i.e., documents with document names "XXXX Finance", "Money & Market" and "ABC Mail Media" are viewed during a certain period, is recorded. Likewise, in the fourth row, "4, 5" which is a viewing history that documents with IDs "4" and "5", i.e., documents with document names "DEF Mariners" and "GHI Mets" are viewed during a certain period, is recorded. These records are daily accumulated and stored as files after the work is finished.

Figure 6:
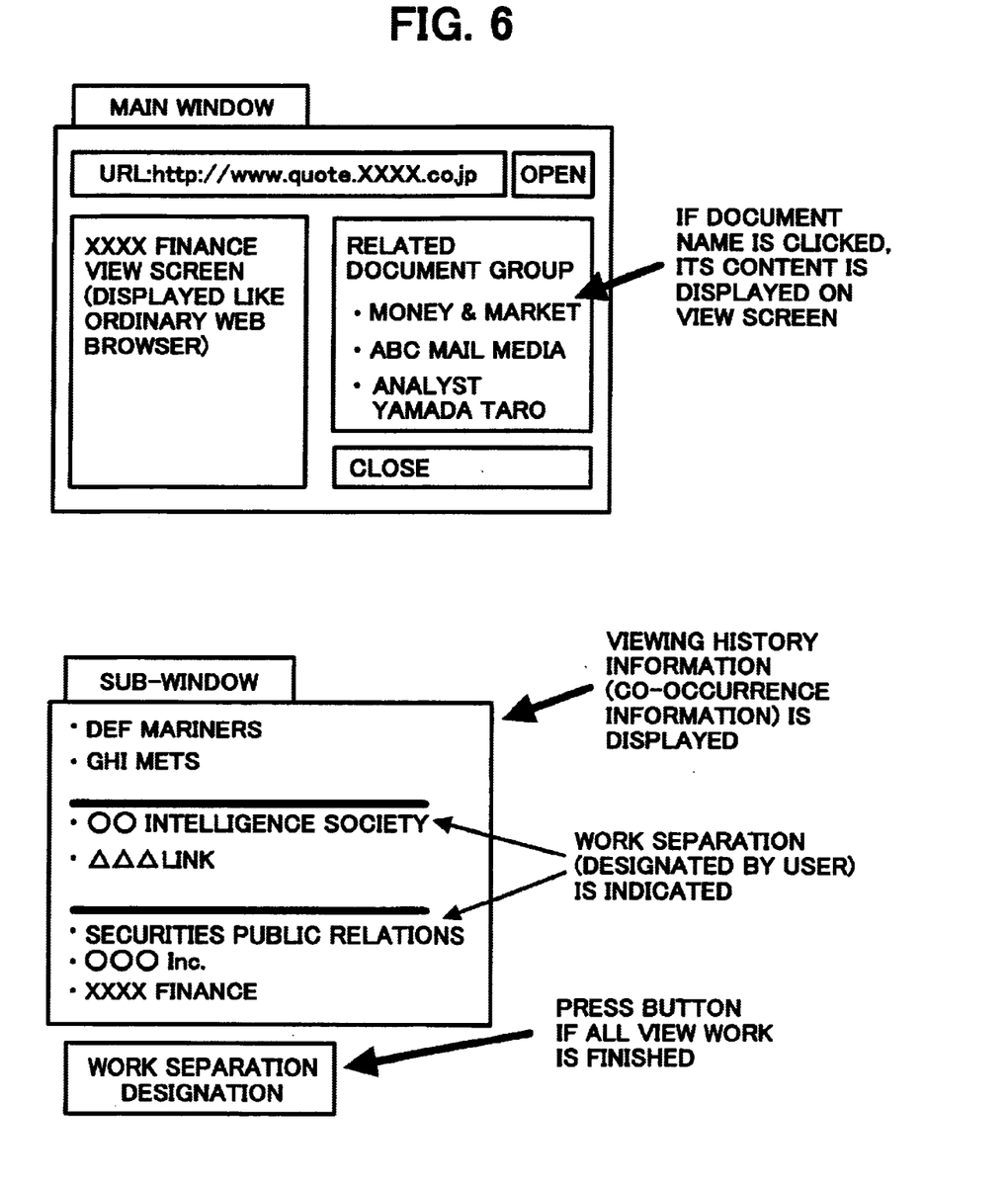
FIG. 6 is a view which shows a user interface.

The related document estimation processor 116 estimates any related document to a document in view by the document viewing apparatus 130. FIG. 6 shows a user interface. The user interface consists of two screens, i.e., a main window and a sub-window.

The main window is provided with a box where a specified document name is input, a box where information for the specified document is displayed so as to view the information, and a box where a group of documents related to the document in view is displayed. As the related document group, three document names "Money & Market", "ABC Mail Media" and "Analyst YAMADA Taro" are enumerated. The related group is a document group which is decided based on the result of analyzing the viewing history information. A method of deciding the group will be explained with reference to a flow chart shown in FIG. 8 described later. The related document estimation processor 116 estimates these related documents.

On the sub-window, histories of the documents which have been viewed are displayed in time series. A thick line separation inserted is a work separation. The work separation is inserted when a user presses a "work separation designation" button.

For example, after the user views a series of baseball-related information ("DEF Mariners" and "GHI Mets"), the user presses the work separation designation button at a timing at which the user starts viewing information related to finance and economy. In addition to the case where this button is pressed by the user, there may be a case where if the user performs no operation for a certain period, e.g., for one hour, the work separation designation is regarded as being automatically input.

Figure 7:
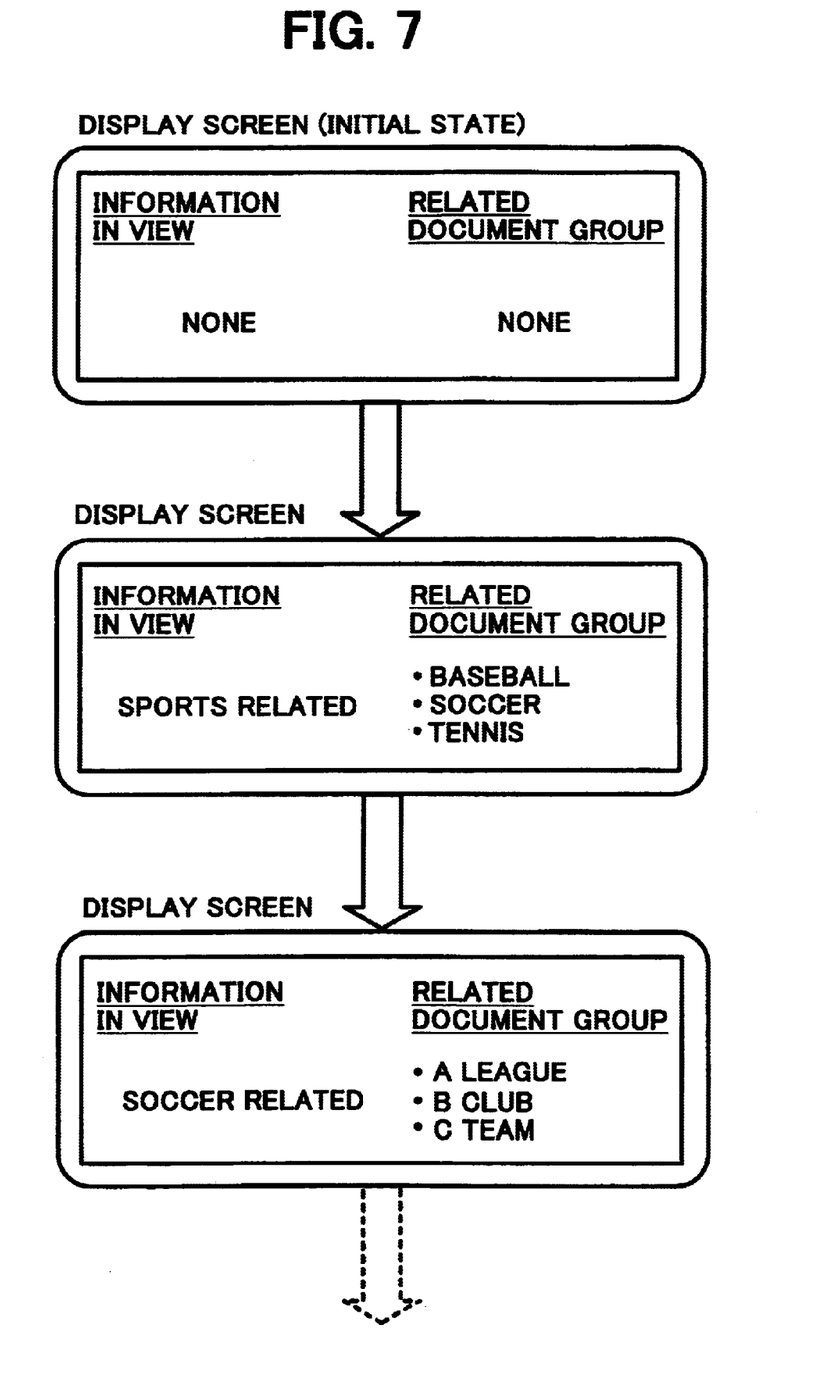
FIG. 7 is a view which shows a time series that is changed in a display screen of a main window.

FIG. 7 shows display screens of the main window in terms of time series so as to help understand an operation image in use. The uppermost display screen is an initial state display screen and no related document groups are displayed. The second display screen is in a state in which the user is viewing sports-related document information and three document names "Baseball", "Soccer", and "Tennis" are enumerated as a related document group. If the user designates "Soccer" as document information to be viewed next, document information on the designated "Soccer" is displayed on the third display screen. In an adjacent box which displays a related document group, information related to documents "Soccer" is displayed.

Figure 8:
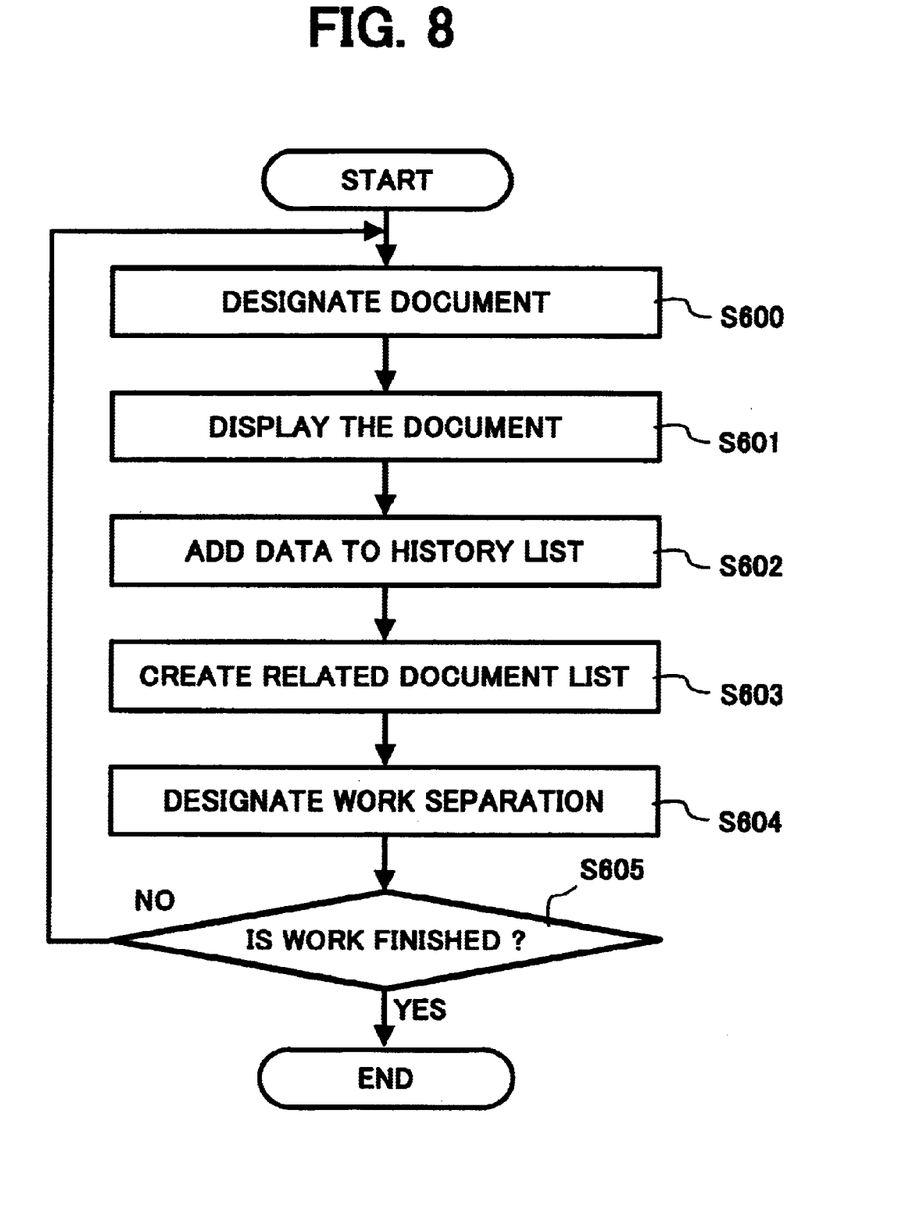
FIG. 8 is a flow chart which shows overall operation procedures for the document processing management system.

A series of these operations will next be explained with reference to the flow chart shown in FIG. 8.

If the use of the document processing management system 100 starts, a document designation processing is received from a user first in a document designation processing (step S600). The user designates a document storage location and a document name, and the content of the designated document is displayed on the main window screen shown in FIG. 7 in the next document display processing (step S601).

In a history list addition processing, the viewing history management section 114 determines whether or not the document information in display has been viewed before while referring to the content of the document management information storage section 113 (step S602). If the document information has been viewed before, the viewing history management section 114 acquires an ID number which corresponds to the document information in display. If the document information has not been viewed before, the viewing history management section 114 issues a new ID to the document management information storage section 113 to register the ID therein. This ID is added to the end of the files shown in FIG. 5 as viewing history information. The document processing management system 100 proceeds to processing for creating a related document group list (step S603).

The processing for creating a related document group list (step S603) which is executed in the related document estimation processor 116 will be explained below.

In the processing for creating a related document group list, the related document estimation processor 116 analyzes the daily-accumulated information for the viewing history, and decides a document group related to the document in view to create a list of the document group. The algorithm of this processing will be explained with reference to FIG. 9. It is assumed that the following three pieces of viewing history information (viewing histories of co-occurrence information 1, 2, and 3) are accumulated and information on "B" is now being viewed. Respective pieces of information "A", "C", and "D" which emerge in the co-occurrence information 1 and co-occurrence information 2 are associated with the information "B". That is, if "B" is being viewed, one of the three types of information "A", "C", and "D" is quite possible to be viewed. An ideal related information group for the user can be estimated by obtaining a posteriori probability distribution (C, 50%, A, 25%, D, 25%) when "B" is being viewed.

A method for calculating the posteriori probability distribution is as follows. Documents which have been used as co-occurrence information before are enumerated with respect to the document which is now being viewed ("B" in FIG. 9). That is, in FIG. 9, the enumerated documents are "A", "C", "C" and "D" which are a combination of "A" and "C" in the co-occurrence information 1 and "C" and "D" in the co-occurrence information 2. A probability is then obtained for each document. As a result, the probability of "C" is 50% since it totally appears twice in the four documents. That of "A" is 25% since it totally appears once in the four documents. That of "D" is also 25% since it totally appears once in the four documents. In this case, when "B" is being viewed, "C" is the most needed information since it is used both in the co-occurrence information 1 and the co-occurrence information 2, and "C" is followed by "A" and "D".

Although an example in which "B" is being viewed has been explained, a related document group can be created for information other than "B" in the same manner. The posteriori probability distribution can be calculated in accordance with a change in information in view and related document groups can be continuously created. By creating a list of related document groups, the result as shown in FIG. 7 is displayed.

The document processing management system 100 proceeds to processing for designating a work separation, and receives an input as to whether or not the user designates a work separation (step S604). If the user does not designate any work separation, the system 100 receives an input as to whether the work is finished (step S605). If the work is not finished (No at step S605), the system 100 returns to the first document designation processing (step S600).

In the second and the following document designation processing, the user may designate a document storage location and a document name as in the same manner as the first document designation processing or the user may select a document from a list which is displayed as a related document group list.

As can be seen, in the document processing management system of this embodiment, by utilizing the statistical property as to how the document groups have been viewed before, it is possible to extract the documents related to the document in view without taking labor and time for classification and ordering of documents, keyword search, and the like. Further, in the document processing management system of this embodiment, by analyzing the time series in which the documents are viewed, it is possible to extract related documents in consideration of user's needs.

In the document processing management system of this embodiment, by analyzing the time series in which the documents are viewed according to each viewing work unit, it is possible to extract related documents in consideration of user's needs for each work unit. In addition, in the document processing management system of this embodiment, by analyzing statistical properties about documents located near the document in view in terms of time series, it is possible to analyze the relation between the documents and the document in view with high accuracy.

In the document processing management system of this embodiment, by obtaining the strength of the relation with the document in view as a probability for a viewing history, it is possible for the user to grasp the strength of the relation. Further, in the document processing management system of this embodiment, by displaying a list of related documents in descending order of viewing probability, it is possible for the user to easily grasp the strength of the relation.

According to this invention, the document processing and management apparatus comprises the viewing history storage unit which extracts document data as a target to which the viewing instruction is issued, from the document data storage unit when an instruction to view the document data is input through the instruction input unit, and which stores the document data as viewed document history information associated with statistical numbers such as the number of times of issuing viewing instructions and a viewing time. The apparatus also comprises the document data extraction unit which analyzes the statistical numbers associated with the viewed document history information stored in the viewing history storage unit, and thereby extracts document data for viewed document history information as related document data from the document data storage unit. The extracted document data has statistical numbers that are approximate to those of the document data as a target to which the viewing instruction is issued by the instruction input unit. Therefore, it is possible to utilize the statistical property as to how the document groups have been viewed before, and it is possible to extract the related documents to the document in view without taking labor and time for classification and ordering of the documents, keyword search and the like.

Moreover, the viewing history storage unit stores the viewing history information as a list of viewing histories arranged in time series, and the document data extraction unit analyzes the time series statistical numbers of the viewing history list which is stored in the viewing history storage unit, and thereby extracts the related document data. Therefore, by analyzing the time series in which the documents are viewed, it is possible to extract related documents in consideration of user's needs.

Furthermore, if predetermined time is measured by the instruction measurement unit or if the change instruction to change document data to be viewed is input through the instruction input unit, the document data extraction unit analyzes the viewing history information associated with the document data other than the document data which the viewing instruction is issued from the document data storage unit, and thereby extracts the related document data from the document data storage unit. Therefore, by analyzing the time series in which the documents are viewed according to each viewing work unit, it is possible to extract related documents in consideration of user's needs for each work unit.

Moreover, the document data extraction apparatus extracts the document data for the viewed document history information as the related document data from the document data storage unit. The extracted document data has viewing times that are approximate, in terms of time series, to those of the document data as a target to which the viewing instruction is issued by the instruction input unit, in the time series viewing history lists which are stored in the viewing history storage unit. Therefore, by analyzing statistical properties about documents located near the document in view in terms of time series, it is possible to analyze the relation between the documents and the document in view with high accuracy.

Furthermore, the document processing and management apparatus further comprises the extraction probability calculation unit which calculates an extraction probability of the document data which is extracted from the document data storage unit as the related document data by the document data extraction unit. Therefore, by obtaining the degree of the relation between the documents and the document in view as a probability in a viewing history, a user can grasp how close the relation is.

Moreover, the document processing and management apparatus further comprises a document data presentation unit which presents the document data stored in the document data storage unit as a related document data list based on the extraction probability which is calculated by the extraction probability calculation unit. The document data presentation unit presents the document data in a descending order of the extraction probability which is calculated by the extraction probability calculation unit. Therefore, by displaying a list of related documents in a descending order of viewing probability, a user can easily grasp how close the relation is.

The present document incorporates by reference the entire contents of Japanese priority document, 2001-274960 filed in Japan on Sep. 11, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-implemented document processing and management method comprising the steps of:

storing received document data;

urging input of a viewing instruction to view document data stored in the document data storage step;

extracting the document data as a target to which the viewing instruction is issued, from the document data storage step when the document data viewing instruction is input through the instruction input step, and which stores the document data as information for a viewed document history associated with statistical numbers, such as a number of times of issuing viewing instructions and a time when the document is viewed; and analyzing the statistical numbers associated with the viewed document history information stored in the viewing history storage step, and extracting any document data for viewed document history information as related document data from the document data storage step based on the analysis, the extracted document data having statistical numbers that are approximate to those of the document data as a target to which the viewing instruction is issued by the instruction input step.

2. The document processing and management method according to claim 1, wherein the viewing history storage step stores the viewing history information as a list of viewing histories arranged in time series, and the document data extraction step analyzes the statistical numbers arranged in time series of the viewing history list which is stored in the viewing history storage step, and extracts the related document data.

3. The document processing and management method according to claim 1, further comprising the steps of:

measuring a time interval at which the instruction input step inputs the instruction, wherein if a predetermined time interval is measured by the instruction measurement step, the document data extraction step analyzes the viewing history information associated with the document data other than the document data as a target to which the viewing instruction is issued, and extracts the related document data from the document data storage step based on the analysis.

4. The document processing and management method according to claim 1, wherein the document data extraction step extracts any document data for viewed document history information as related document data from the document data storage step, the extracted document data having viewing times that are approximate, in terms of time series, to those of the document data as a target to which the viewing instruction is issued by the instruction input step, in the viewing history lists created in time series which are stored in the viewing history storage step.

5. The document processing and management method according to claim 1, further comprising an extraction probability calculation step which calculates an extraction probability of any document data which is extracted as related document data from the document data storage step by the document data extraction step.

6. The document processing and management method according to claim 1, further comprising the steps of:

presenting the document data which is stored in the document data storage step as a list of related document data based on the extraction probability which is calculated by the extraction probability calculation step, wherein the document data presentation step presents the document data in a descending order of the extraction probability which is calculated by the extraction probability calculation step.

7. A document processing and management apparatus comprising:

a document data storage unit which stores received document data;

an instruction input unit which urges input of a viewing instruction to view document data stored in the document data storage unit or input of a change instruction to change document data to be viewed;

a viewing history storage unit which extracts the document data as a target to which the viewing instruction is issued, from the document data storage unit when the document data viewing instruction is input through the instruction input unit, and which stores the document data as information for a viewed document history associated with statistical numbers, such as a number of times of issuing viewing instructions and a time when the document is viewed; and a document data extraction unit which analyzes the statistical numbers associated with the viewed document history information stored in the viewing history storage unit, and extracting any document data for viewed document history information as related document data from the document data storage unit based on the analysis, the extracted document data having statistical numbers that are approximate to those of the document data as a target to which the viewing instruction is issued by the instruction input unit.

8. The document processing and management apparatus according to claim 1, wherein the viewing history storage unit stores the viewing history information as a list of viewing histories arranged in time series, and the document data extraction unit analyzes the statistical numbers arranged in time series of the viewing history list which is stored in the viewing history storage unit, and extracts the related document data.

9. The document processing and management apparatus according to claim 7 or 8, further comprising:

an instruction measurement unit which measures a time interval at which the instruction input unit inputs the instruction, wherein when predetermined time interval is measured by the instruction measurement unit or if an instruction to change the viewed document data is input through the instruction input unit, the document data extraction unit analyzes the viewing history information associated with the document data other than the document data as a target to which the viewing instruction is issued, and extracts the related document data from the document data storage unit based on the analysis.

10. The document processing and management apparatus according to claim 1, wherein the document data extraction unit extracts any document data for viewed document history information as related document data from the document data storage unit, the extracted document data having viewing times that are approximate, in terms of time series, to those of the document data as a target to which the viewing instruction is issued by the instruction input unit, in the viewing history lists created in time series which are stored in the viewing history storage unit.

11. The document processing and management apparatus according to claim 1, further comprising an extraction probability calculation unit which calculates an extraction probability of any document data which is extracted as related document data from the document data storage unit by the document data extraction unit.

12. The document processing and management apparatus according to claim 5, further comprising:

a document data presentation unit which presents the document data which is stored in the document data storage unit as a list of related document data based on the extraction probability which is calculated by the extraction probability calculation unit, wherein the document data presentation unit presents the document data in a descending order of the extraction probability which is calculated by the extraction probability calculation unit.

13. A document processing and management apparatus comprising:

a document data storage means for storing received document data;

an instruction input means for urging input of a viewing instruction to view document data stored in the document data storage means or input of a change instruction to change document data to be viewed;

a viewing history storage means for extracting the document data as a target to which the viewing instruction is issued, from the document data storage means when the document data viewing instruction is input through the instruction input means, and which stores the document data as information for a viewed document history associated with statistical numbers, such as a number of times of issuing viewing instructions and a time when the document is viewed; and a document data extraction means for analyzing the statistical numbers associated with the viewed document history information stored in the viewing history storage means, and extracting any document data for viewed document history information as related document data from the document data storage means based on the analysis, the extracted document data having statistical numbers that are approximate to those of the document data as a target to which the viewing instruction is issued by the instruction input means.

14. The document processing and management apparatus according to claim 13, wherein the viewing history storage means stores the viewing history information as a list of viewing histories arranged in time series, and the document data extraction means analyzes the statistical numbers arranged in time series of the viewing history list which is stored in the viewing history storage means, and extracts the related document data.

15. The document processing and management apparatus according to claim 13, further comprising:

an instruction measurement means which measures a time interval at which the instruction input means inputs the instruction, wherein when a predetermined time interval is measured by the instruction measurement means, the document data extraction means analyzes the viewing history information associated with the document data other than the document data as a target to which the viewing instruction is issued, and extracts the related document data from the document data storage means based on the analysis.

16. The document processing and management apparatus according to claim 13, wherein the document data extraction means extracts any document data for viewed document history information as related document data from the document data storage means, the extracted document data having viewing times that are approximate, in terms of time series, to those of the document data as a target to which the viewing instruction is issued by the instruction input means, in the viewing history lists created in time series which are stored in the viewing history storage means.

17. The document processing and management apparatus according to claim 13, further comprising an extraction probability calculation means which calculates an extraction probability of any document data which is extracted as related document data from the document data storage means by the document data extraction means.

18. The document processing and management apparatus according to claim 17, further comprising:

a document data presentation means which presents the document data which is stored in the document data storage means as a list of related document data based on the extraction probability which is calculated by the extraction probability calculation means, wherein the document data presentation means presents the document data in a descending order of the extraction probability which is calculated by the extraction probability calculation means.

* * * * *